US008371652B2

(12) United States Patent
Revell

(10) Patent No.: US 8,371,652 B2
(45) Date of Patent: Feb. 12, 2013

(54) BACKREST FOR MOTORCYCLES

(76) Inventor: John R. Revell, Ballwin, MO (US)

( * ) Notice: Subject to any disclaimer, the term of this patent is extended or adjusted under 35 U.S.C. 154(b) by 223 days.

(21) Appl. No.: 12/939,842

(22) Filed: Nov. 4, 2010

(65) Prior Publication Data
US 2011/0115266 A1 May 19, 2011

Related U.S. Application Data

(60) Provisional application No. 61/272,903, filed on Nov. 17, 2009.

(51) Int. Cl.
*A47C 15/00* (2006.01)
*B62J 9/00* (2006.01)
(52) U.S. Cl. .................... 297/352; 280/288.4
(58) Field of Classification Search ............ 297/352, 297/215.11, 215.12, 215.13, 230.1; 280/288.4, 280/490.1, 727
See application file for complete search history.

(56) References Cited

U.S. PATENT DOCUMENTS

| | | | |
|---|---|---|---|
| 1,462,976 A | 7/1923 | Mesinger | |
| 2,448,924 A | 9/1948 | Smith | |
| 3,940,166 A * | 2/1976 | Smithea | 297/215.11 |
| 5,441,330 A * | 8/1995 | Rojas | 297/383 |
| 5,553,915 A * | 9/1996 | Stamatakis | 297/195.13 |
| 6,224,081 B1 | 5/2001 | Wayman et al. | |
| 6,761,401 B1 * | 7/2004 | McGlynn | 297/215.12 |
| 6,991,290 B1 | 1/2006 | Wiertzema | |
| 7,077,470 B1 | 7/2006 | Strother | |
| D528,311 S | 9/2006 | Stahel et al. | |
| D573,802 S | 7/2008 | Mills | |
| 2002/0153398 A1 | 10/2002 | Dudek et al. | |
| 2005/0046250 A1 | 3/2005 | Renner | |
| 2005/0275268 A1 | 12/2005 | Oomori | |
| 2006/0290179 A1 | 12/2006 | Reinhard | |
| 2007/0181757 A1 | 8/2007 | Sharpe et al. | |
| 2008/0084097 A1 | 4/2008 | Botting | |

FOREIGN PATENT DOCUMENTS
CA 2304455 11/2001

OTHER PUBLICATIONS

Website, http://www.corbin.com/accessories/bkrest.shtml, series of removable backrests for motorcycles, three sheets printed from the internet on May 24, 2009.

* cited by examiner

*Primary Examiner* — Milton Nelson, Jr.
(74) *Attorney, Agent, or Firm* — Richard C. Litman

(57) ABSTRACT

The backrest for motorcyclists includes a base plate with a pivoting and telescoping strut extending from its forward end. The upper end of the strut has a cushioned seatback pivotally attached thereto. The strut is adjustable to optimize the seatback height. The fore and aft angle of the strut, and thus the angular position of the seatback, is adjusted by an adjustable stop at the base of the strut. The stop limits the rearward angular motion of the strut, but allows the strut to pivot forward against the seating surface to facilitate mounting and dismounting of the motorcycle. The base plate is removably secured to the seat by lateral straps that hook beneath the edges of the seat. The span of the straps may be adjusted by laterally telescoping strap brackets extending from the plate. The bottom of the plate is coated with a non-slip material for greater security.

20 Claims, 9 Drawing Sheets

BACKREST FOR MOTORCYCLES

CROSS-REFERENCE TO RELATED APPLICATION

This application claims the benefit of U.S. Provisional Patent Application Ser. No. 61/272,903, filed Nov. 17, 2009.

BACKGROUND OF THE INVENTION

1. Field of the Invention

The present invention relates generally to seating for motor vehicles, and particularly to a backrest for motorcycles, which provides an adjustable backrest that may be removably secured to a conventional motorcycle seat without modification of the seat to provide additional support and comfort to the cyclist.

2. Description of the Related Art

The conventional motorcycle has an elongate and relatively narrow seat that is straddled by the cyclist during operation, and also by the passenger if a passenger happens to accompany the cyclist. Conventional motorcycle seats are not provided with any form of back support, as the need for back support is not considered critical by most motorcycle manufacturers. While some exceptions occur, particularly in higher end motorcycles, the above is generally true with motorcycles built primarily for the transport of a single operator and for speed and handling qualities.

As a result, many customized motorcycles have been constructed with seat back support, particularly in the form of so-called "sissy bars" for the rear passenger. Such bars are often more of a style statement than a practical support for the passenger, but other seat backrests have also been developed for the operator of the motorcycle as well. These various motorcycle operator backrests are generally permanently installed, and even those that are removable generally require some permanent modification to the motorcycle in the form of drilled holes, weldments, added brackets, etc. Moreover, even when installed, such backrests do not provide the range of adjustment in terms of fore and aft positioning, height adjustment, and angular rake adjustment that would be desired to suit a wide range of different riders and/or conditions.

The present inventor is aware of various motorcycle seat backrests that have been developed in the past. An example of such is found in Canadian Patent Publication No. 2,304,455 published on Nov. 1, 2001 to Mario Leblanc et al. According to the drawings (no English abstract or translation was provided), the device of the '455 Canadian Patent Publication comprises a backrest supported on an arm, the arm being adjustably mounted atop a bracket. The base of the bracket appears to have a plurality of attachment holes therein, but no attachment or environmental view is illustrated.

Thus, a backrest for motorcyclists solving the aforementioned problems is desired.

SUMMARY OF THE INVENTION

The backrest for motorcyclists provides support for the lower or mid-back of the cycle operator, and thus greater comfort and security for the operator. The backrest extends from a base plate that is removably secured to the seat immediately behind the operator by a pair of adjustable lateral straps that hook beneath the lower edges of the seat structure. The bottom surface of the base plate is preferably coated or provided with a material having a high coefficient of friction, e.g., a soft plastic, Neoprene®, etc., to reduce or prevent slippage. This attachment system does not require any modification to the motorcycle, and thus does not reduce the value of the motorcycle due to alterations or modifications. Laterally extending support for the straps is provided by laterally telescoping brackets that extend from the plate as required for different seat widths.

A telescoping seatback support strut is pivotally attached to the forward edge or end of the base plate. The strut extension may be adjusted as desired by the cyclist to position the seatback at the height desired. An adjustable stop is provided immediately behind the strut, allowing the fore and aft angle or rake of the strut, and therefore the seatback as well, to be adjusted as desired. The strut is free to fold forward to facilitate mounting and dismounting of the operator from the motorcycle. The seatback is pivotally attached to the upper or distal end of the strut, and automatically adjusts to provide optimum contact and support for the lower back of the cyclist.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The backrest for motorcyclists provides a backrest removably attachable to the seat structure of the motorcycle and extending behind the cyclist or operator. The backrest requires no modification of the motorcycle, and may be installed or removed in only a minute or two.

Figure 1:
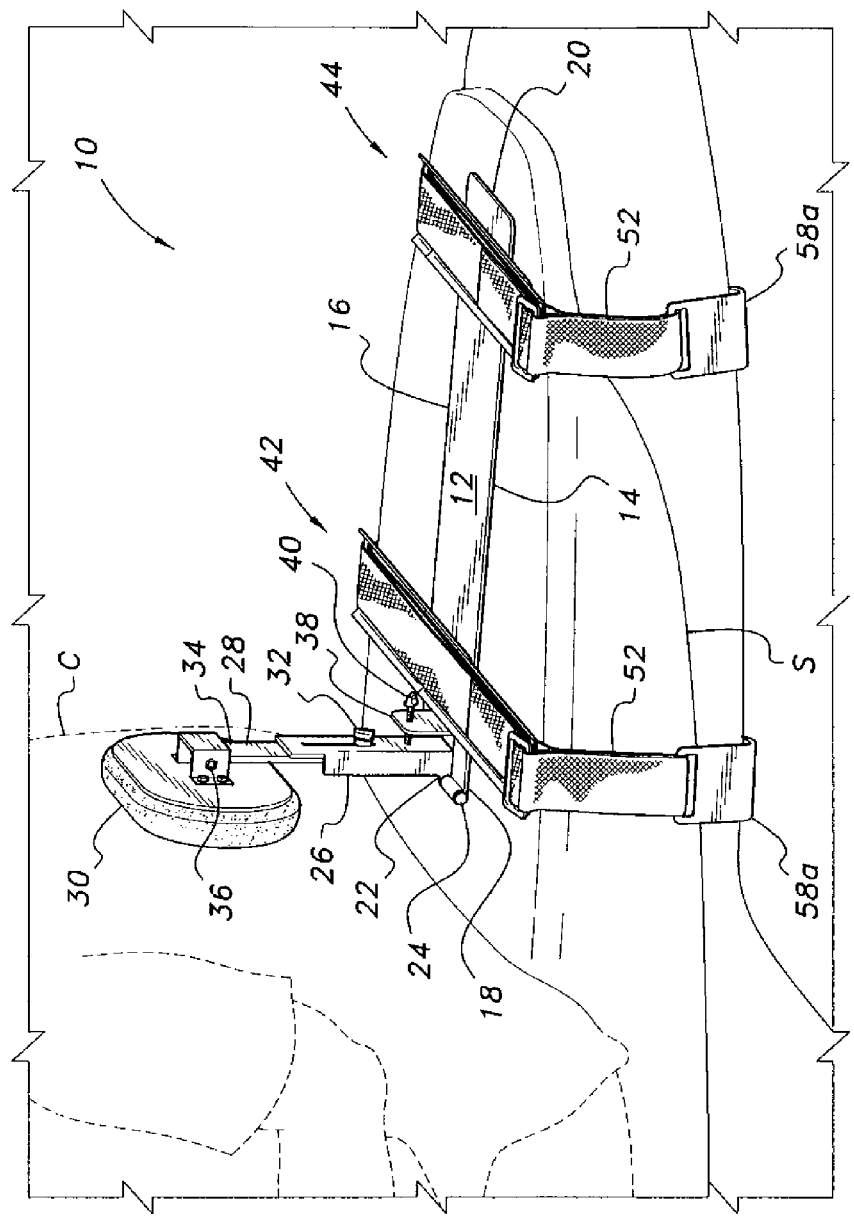
FIG. 1 is an environmental, perspective view of a backrest for motorcyclists according to the present invention, showing its removable attachment to a motorcycle seat.

FIG. 1 of the drawings provides an environmental perspective view of a first embodiment of the backrest 10, shown installed upon the seat S of a motorcycle. The backrest 10 includes a rigid, elongate base plate 12 of metal or a strong and dense plastic material, with the plate 12 having a left edge 14, an opposite right edge 16, a forward edge or end 18, and a rearward edge or end 20. An alternative embodiment of the backrest 110 having a thicker base plate 112 is illustrated in the left side elevation view of FIG. 2 and discussed further below, with the primary difference between the two embodiments being the construction and thickness of the base plate.

A seatback support strut extends from the forward edge 18 of the base plate 12. The attachment end 22 of the strut is pivotally attached to the forward edge 18 of the base plate 12 by a hinge pintle 24 extending laterally across the forward edge 18 of the base plate 12. The seatback support strut actually comprises a base plate attachment portion 26. The attachment end 22 of the strut is pivotally attached to the pintle 24, and a seatback attachment portion 28 telescopically extends from the base plate attachment portion 26. The two telescoping portions 26 and 28 may comprise mating channels, tubular members, or other configurations, wherein the smaller diameter member is retained by and telescopes from the larger diameter member. The two telescoping portions 26 and 28 allow the backrest 30 to be adjusted in height to provide optimum support for the cyclist C, as shown in broken lines in FIG. 1. A manually adjustable lock screw 32 extends through a slot in the rearward wall of the outermost of the two telescoping strut portions 26 and 28, and threads into a passage in the rearward wall of the other strut member. The screw 32 may be threadably locked in place to secure the positions of the two strut portions 26 and 28 relative to one another, thereby locking the height of the backrest 30.

The backrest 30 preferably includes a forward cushion or pad. The backrest 30 is pivotally secured to the distal end 34 of the seatback attachment portion 28 of the strut by a bracket having a laterally disposed pivot pin or bolt 36 therethrough. The backrest 30 is free to pivot upwardly and downwardly about the pin or bolt 36 to the limits of the structure to which it is attached, automatically conforming to an optimal fit against the back of the cyclist using the backrest assembly 10.

The seatback support strut is free to hinge, pivot, or fold forward by its attachment to the support strut hinge pintle 24 to rest upon the forward portion of the motorcycle seat S when not in use, or to allow the cyclist to more readily swing his or her leg over the seat when mounting or dismounting from the motorcycle. However, a stop 38 extends upwardly from the forward portion of the base plate 12 to limit the rearward pivotal travel of the support strut. Adjustment to this rearward limit is provided by a manually adjustable screw 40 extending through the stop. The forward end of the screw 40 bears against the back of the base plate attachment portion 26 of the seatback support strut. The screw 40 may be threadably advanced or retracted through the stop 38 to adjust the position of its forward end, thereby adjusting the rearward limit of travel for the strut assembly and its backrest 30.

The removable backrest attaches to the seat S by means of its forward and rearward attachment strap assemblies 42 and 44, respectively. These two attachment strap assemblies 42 and 44 are preferably identical to one another. One such strap assembly is shown in detail in FIG. 3 of the drawings. An alternative embodiment of the attachment strap assembly is shown in FIG. 4 and discussed further below.

Figure 3:
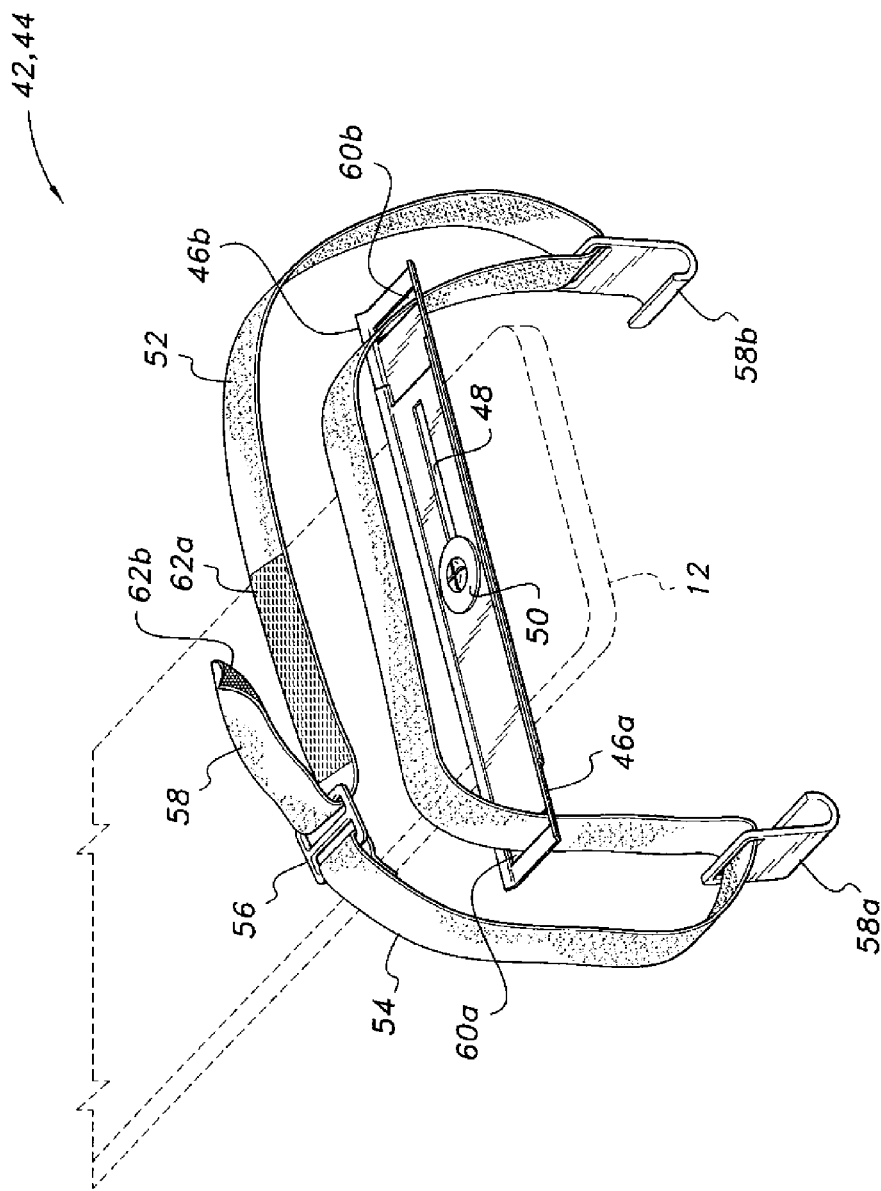
FIG. 3 is a perspective view of a single attachment strap bracket assembly for a backrest for motorcyclists according to the present invention, with a single adjustable strap installed thereon.
Figure 4:
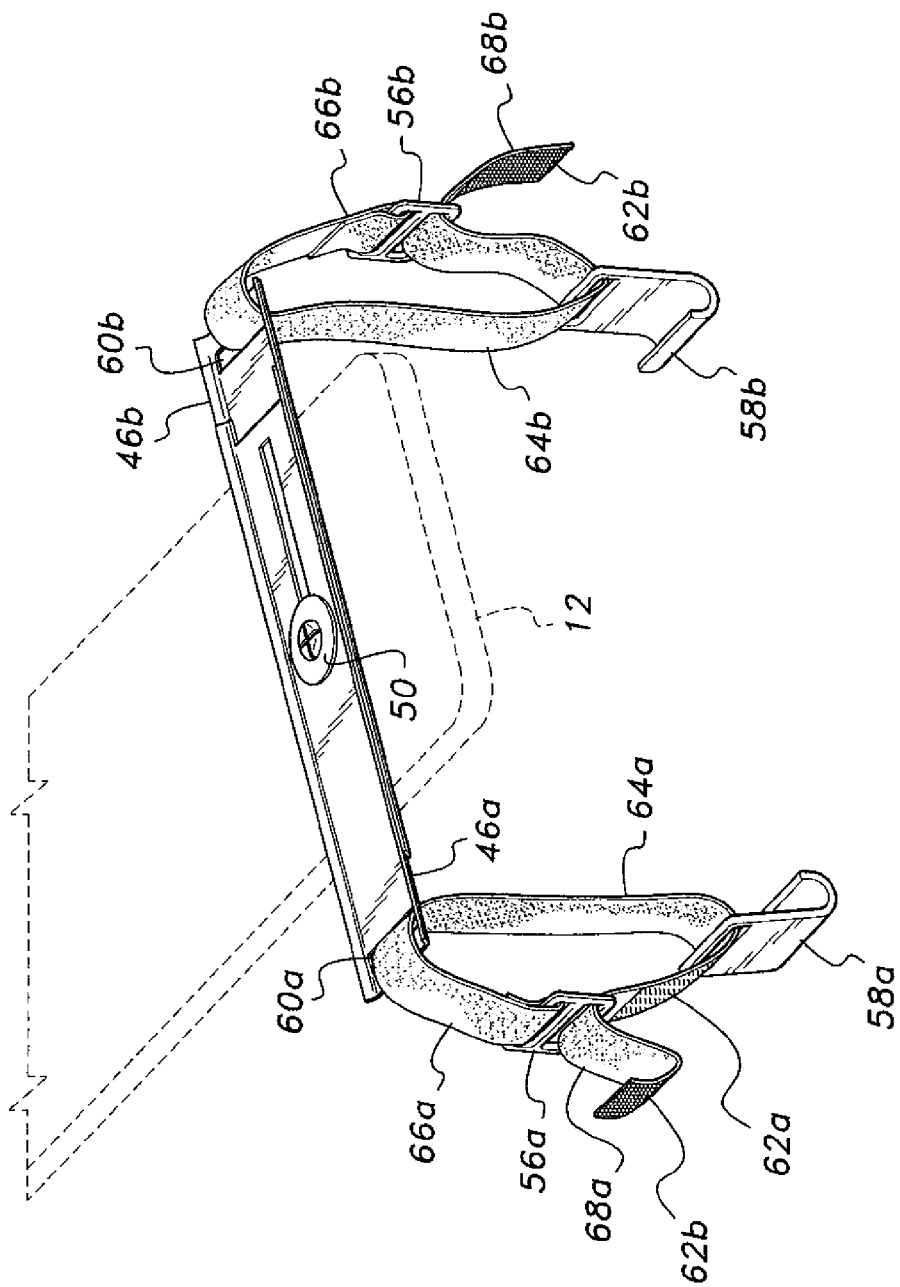
FIG. 4 is a perspective view of an alternative embodiment of a single attachment strap bracket assembly or a backrest for motorcyclists according to the present invention, having a separate adjustable attachment strap at each end thereof.
Figure 5:
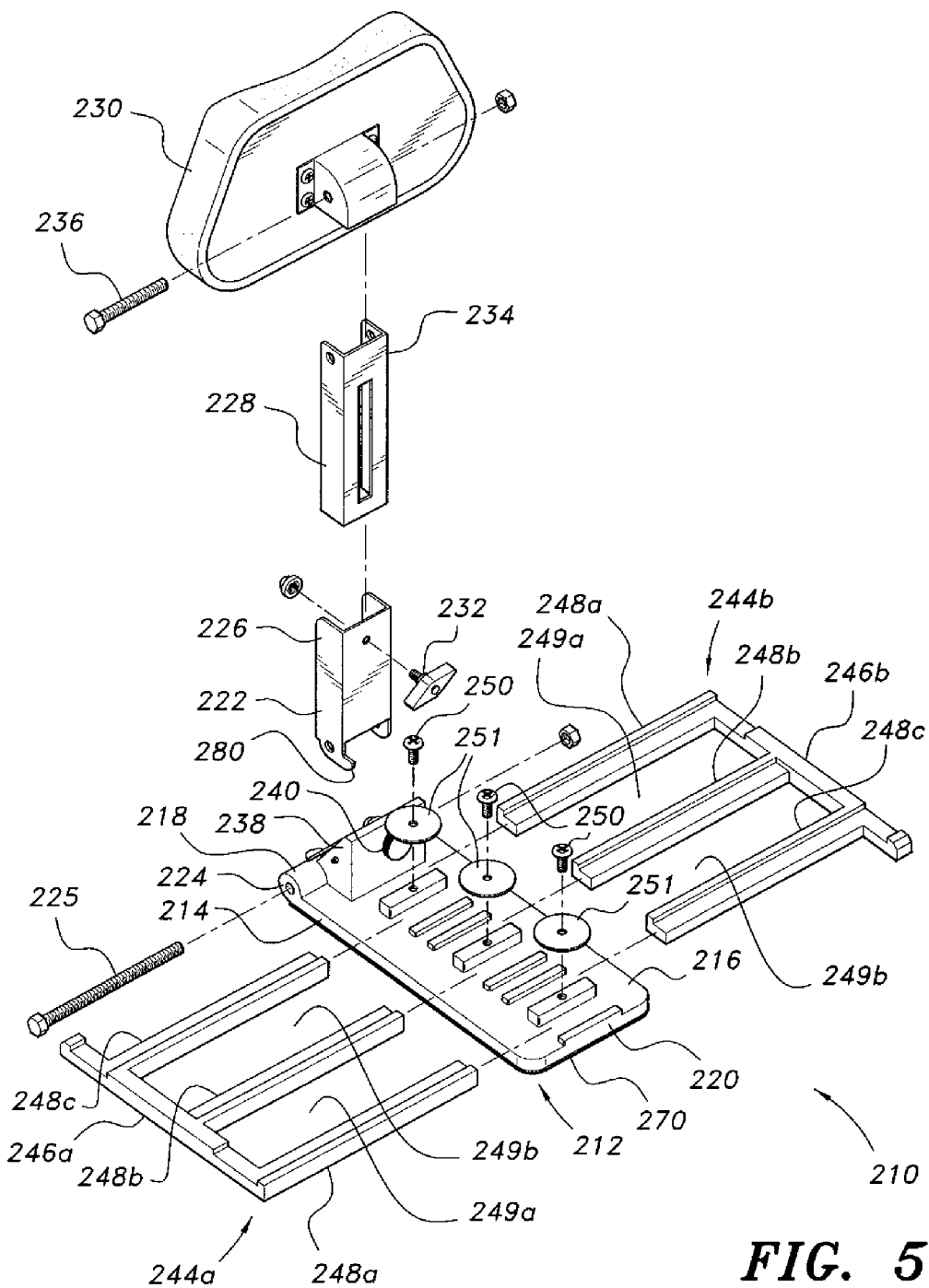
FIG. 5 is an exploded rear perspective view of an alternative embodiment of a backrest for motorcyclists according to the present invention, illustrating its components and their relationship.
Figure 6:
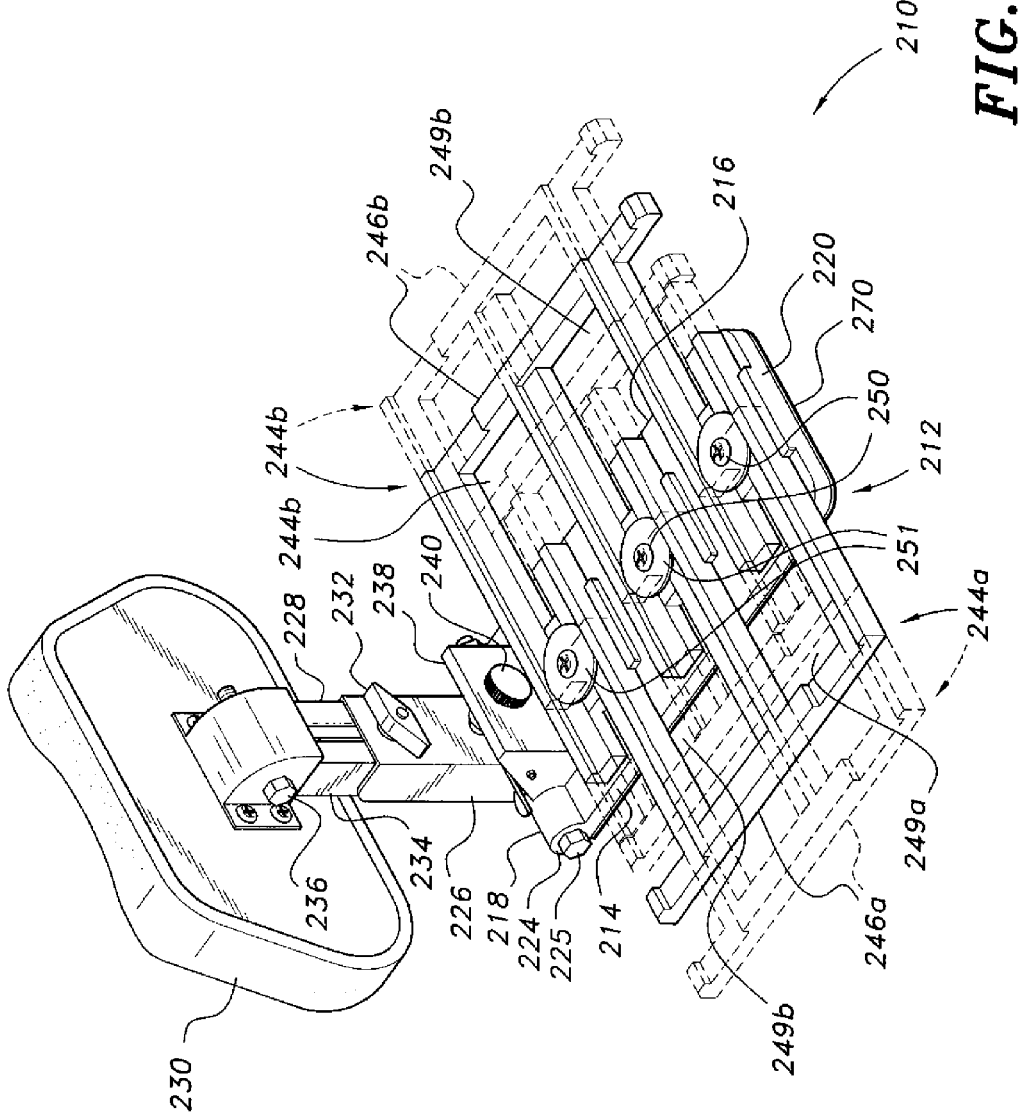
FIG. 6 is a rear perspective view of the backrest of FIG. 5, illustrating the assembly of the components and the lateral adjustability of the strap support members.

Each of the identical forward and rearward attachment strap assemblies 42, 44, shown particularly in FIG. 3 of the drawings, includes a strap bracket assembly comprising two substantially identical, rigid, laterally opposed overlapping strap support members, including a left member 46a and a right member 46b, as shown in FIG. 3. These two strap support members are adjustably extendible relative to the base plate 12 and motorcycle seat S to adjust the spacing of the attachment straps (discussed further below) for different widths of motorcycle seats.

Each strap support member 46a, 46b is provided with opposite outwardly and upwardly angled flanges along their elongate edges. One of the support members, e.g., left member 46a, nests within the other support member, e.g., 46b, by means of their mating flanges. Each of the two strap support members 46a, 46b is provided with an elongate, longitudinal (relative to the elongate major dimensions of the support members) adjustment slot 48 extending along the center thereof, allowing the strap support members 46a, 46b to slide laterally relative to one another and to be adjusted laterally relative to the base plate 12 about a threaded member 50 extending upwardly from the base plate 12. The threaded members 50 may comprise bolts threaded into cooperating passages into or through the base plate, as shown with the alternative base plate 112 of FIG. 2, or may comprise a threaded stud rigidly extending from the base plate, the slots of the strap bracket members 46a and 46b passing thereover and being clamped immovably to the underlying base plate by a cooperating nut or the like.

Figure 2:
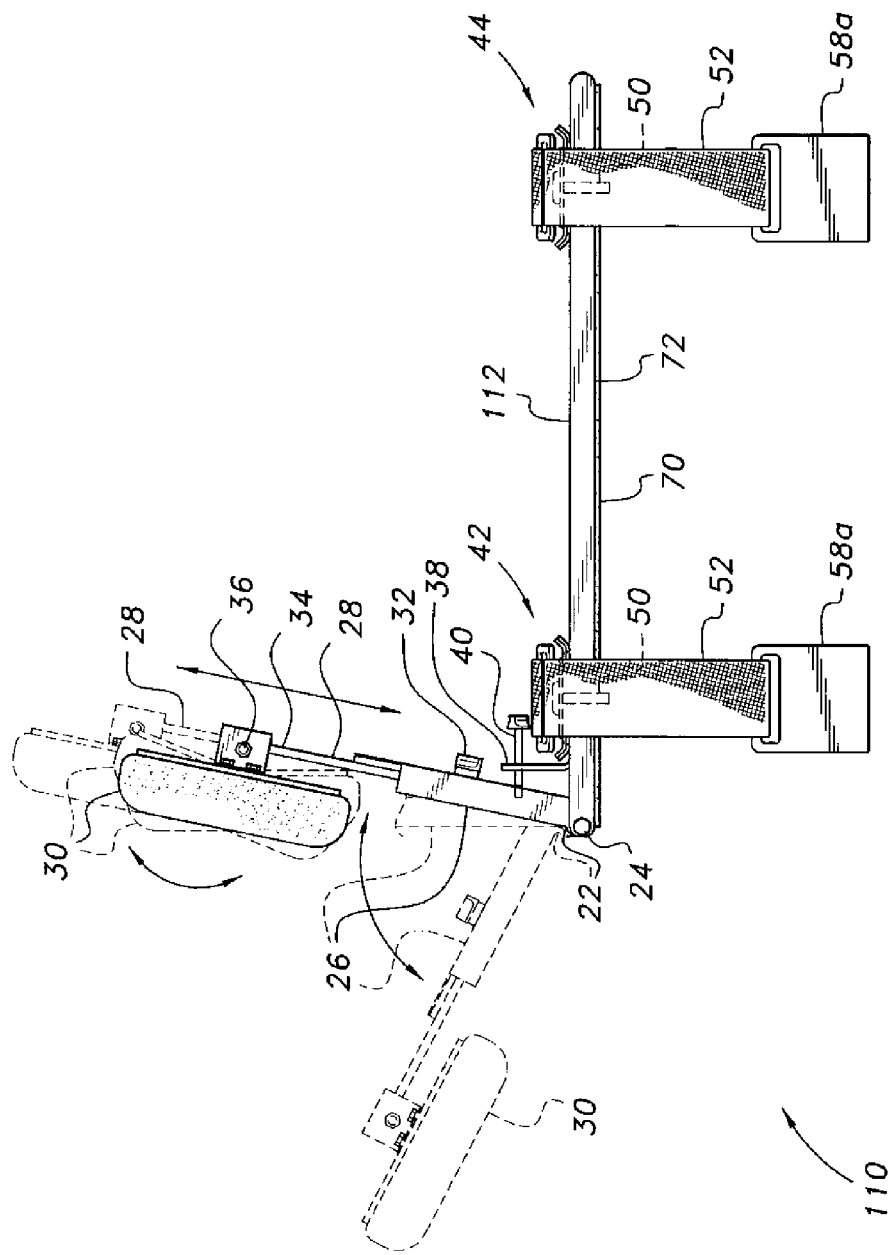
FIG. 2 is a left side elevation view of an alternative embodiment of a backrest for motorcyclists according to the present invention, showing the various angular and height adjustments provided by the backrest.

Various attachment strap configurations may be provided, as noted further above. FIGS. 1 and 2 generally illustrate a single strap configuration, with FIG. 3 illustrating such a single strap configuration in detail for each of the two attachment strap assemblies 42 and 44. The single strap 52 shown in FIG. 3 has a first end 54 permanently attached to an adjustment buckle 56, and an opposite second end 58. The strap 52 extends from the buckle 56, downwardly to a seat base attachment portion, passing through the eye or slot of a first seat base hook 58a. The strap 52 then extends upwardly to pass through a slot 60a across the outboard end of the first strap bracket member 46a, thence over the tops of the two strap bracket members 46a and 46b, and downwardly through the slot 60b in the second strap bracket member 46b. The strap 52 then passes through the eye of a second seat base hook 58b, and then continues upwardly over the underlying strap portion to pass through the buckle 56. The upper surface of this portion of the strap 52, i.e., the top portion, may be provided with some form of attachment means 62a, e.g., either the hook or the loop portion of hook and loop fabric fastener material. The surface of the second end 58 extending from the buckle 56 is provided with mating fastening material 62b. Thus, the strap 52 may be secured tightly across the two strap bracket members 46a and 46b once the two seat base hooks 58a and 58b have been hooked to the seat base structure underlying the motorcycle seat S. The two hooks 58a, 58b are preferably coated with a relatively soft and/or resilient material to avoid marring the underlying seat support structure of the motorcycle.

FIG. 4 illustrates an alternative embodiment of the bracket 46a, 46b and strap attachment assembly. The two strap bracket members 46a and 46b of the seat attachment embodiment of FIG. 4 are identical to the members 46a and 46b shown in other drawings discussed further above. However, each strap bracket member 46a and 46b has a separate strap 64a and 64b, respectively, in the embodiment of FIG. 4. Each strap 64a and 64b has a first end 66a and 66b having a buckle 56a and 56b permanently attached thereto. The two buckles 56a, 56b are substantially identical to the single buckle 56 of the single strap attachment embodiment of FIG. 3. Each of the straps extends from its buckle through the slot 60a or 60b of its respective strap bracket member 46a or 46b, thence downward to pass through the slot or eye of its respective seat base hook 58a or 58b, and back through the respective buckle 56a or 56b. The second end 68a and 68b of each strap doubles back to attach to the adjacent strap portion by means of mating hook and loop fastener material 62a and 62b in the manner used to secure the single strap 52 to itself, as shown in FIG. 3.

The backrest for motorcyclists 10 or 110 is used by initially placing the device atop the seat S of the motorcycle and positioning it as desired, e.g., as shown in FIG. 1 of the drawings. The forward and rearward pairs of strap bracket members 46a and 46b are adjusted to the desired width in accordance with the width of the motorcycle seat S by loosening the threaded fastener or member 50 passing through the two bracket members 46a, 46b, and sliding the two members inwardly or outwardly relative to one another until the desired span is achieved. The fastener 50 is then tightened to lock this span adjustment.

The strap 52 (FIGS. 1 through 3) or straps 64a and 64b (FIG. 4) may then be adjusted as desired. The strap or straps is/are cinched up to some degree in order to remove excessive slack, and the seat base hooks 58a, 58b are hooked under the edges of the seat support pan or structure. The strap or straps 52 or 64a and 64b are then tightened and secured as explained further above to complete the installation of the backrest 10 or 110 atop the motorcycle seat S. Additional security for the backrest 10 or 110 may be provided by applying a coating 70 having a high coefficient of friction, e.g., Neoprene® or other suitable material, to the underlying seat contact surface 72 of the base plate 12 or 112, as shown on the underside of the base plate 112 of FIG. 2. At this point, the height and angle of the seatback 30 may be adjusted as desired, and the backrest is ready for use.

The adjustable strut is folded forwardly to place the seatback 30 against the forward portion of the motorcycle seat S to facilitate mounting the motorcycle, and then extended back to its operational position to allow the motorcyclist to place his or her back against the seatback 30 for support while riding. Removal of the device is accomplished essentially by reversing the steps described above. The motorcycle remains unmodified and undamaged throughout the installation, use, and removal of the backrest 10 or 110.

FIGS. 5 through 9 of the drawings illustrate an additional embodiment of the backrest for motorcyclists, designated as backrest 210. The backrest 210 includes a rigid, elongate base plate 212 of metal or a strong and dense plastic material, with the plate 212 having a left edge 214, an opposite right edge 216, a forward edge or end 218, and a rearward edge or end 220.

A seatback support strut extends from the forward edge 218 of the base plate 212. The attachment end 222 of the strut is pivotally attached to the forward edge 218 of the base plate 212 by a pair of lugs or bosses 224 extending laterally along the forward edge 218 of the base plate 212, with a lateral bolt, pin or pintle 225 extending through the lugs or bosses 224 and through passages in the attachment end 222 of the strut. The seatback support strut actually comprises a base plate attachment portion 226. A seatback attachment portion 228 telescopically extends from the base plate attachment portion 226. The two telescoping portions 226 and 228 may comprise mating channels, tubular members, or other configurations, wherein the smaller diameter member is retained by and telescopes from the larger diameter member. The two telescoping portions 226 and 228 allow the backrest 230 to be adjusted in height to provide optimum support for the cyclist C. A manually adjustable lock screw 232 extends through a slot in the rearward wall of the outermost of the two telescoping strut portions 226 and 228, and threads into a passage in the rearward wall of the other strut member. The screw 232 may be threadably locked in place to secure the positions of the two strut portions 226 and 228 relative to one another, thereby locking the height of the backrest 230.

The backrest 230 preferably includes a forward cushion or pad. The backrest 230 is pivotally secured to the distal end 234 of the seatback attachment portion 228 of the strut by a bracket having a laterally disposed pivot pin or bolt 236 therethrough. The backrest 230 is free to pivot upwardly and downwardly about the pin or bolt 236 to the limits of the structure to which it is attached, automatically conforming to an optimal fit against the back of the cyclist using the backrest assembly 210.

The seatback support strut is free to hinge, pivot, or fold forward by its attachment to the support strut hinge pintle 224 to rest upon the forward portion of the motorcycle seat when not in use, or to allow the cyclist to more readily swing his or her leg over the seat when mounting or dismounting from the motorcycle. However, a stop 238 extends upwardly from the forward portion of the base plate 212 to limit the rearward pivotal travel of the support strut. Adjustment to this rearward limit is provided by a manually adjustable screw 240 extending through the stop. The forward end of the screw 240 bears against the back of the base plate attachment portion 226 of the seatback support strut. The screw 240 may be threadably advanced or retracted through the stop 238 to adjust the position of its forward end, thereby adjusting the rearward limit of travel for the strut assembly and its backrest 230.

The backrest 210 of FIGS. 5 through 9 includes an additional feature not found in the backrest 10 of FIGS. 1 through 4. The backrest 210 includes a latch mechanism to secure the backrest support strut assembly 226, 228 in its upright position until the latch is released. This latch mechanism is shown in detail in FIGS. 8 and 9 of the drawings. The lower or attachment end 222 includes a rearwardly extending tab or catch 280 that selectively engages a spring-loaded latch plate 282. The latch plate 282 is pivotally secured between the two strut attachment lugs or bosses 224 by a lateral bolt or pin 284, installed through one of the walls of the backrest strut stop 238. The latch plate 282 includes a lower edge 286 that selectively engages the tab or catch 280 of the lower end 222 of the base plate attachment portion 226 of the seatback support strut assembly. A spring 288 is captured between a downwardly depending end and tab 290 of the latch plate 282 and a spring seat 292 formed in the lower end of the backrest strut stop 238, with the spring 288 urging the lower portion of the latch plate 282 and its lower edge 286 forwardly to engage the catch or tab 280 of the lower portion 286 of the seatback support strut.

Figure 9:
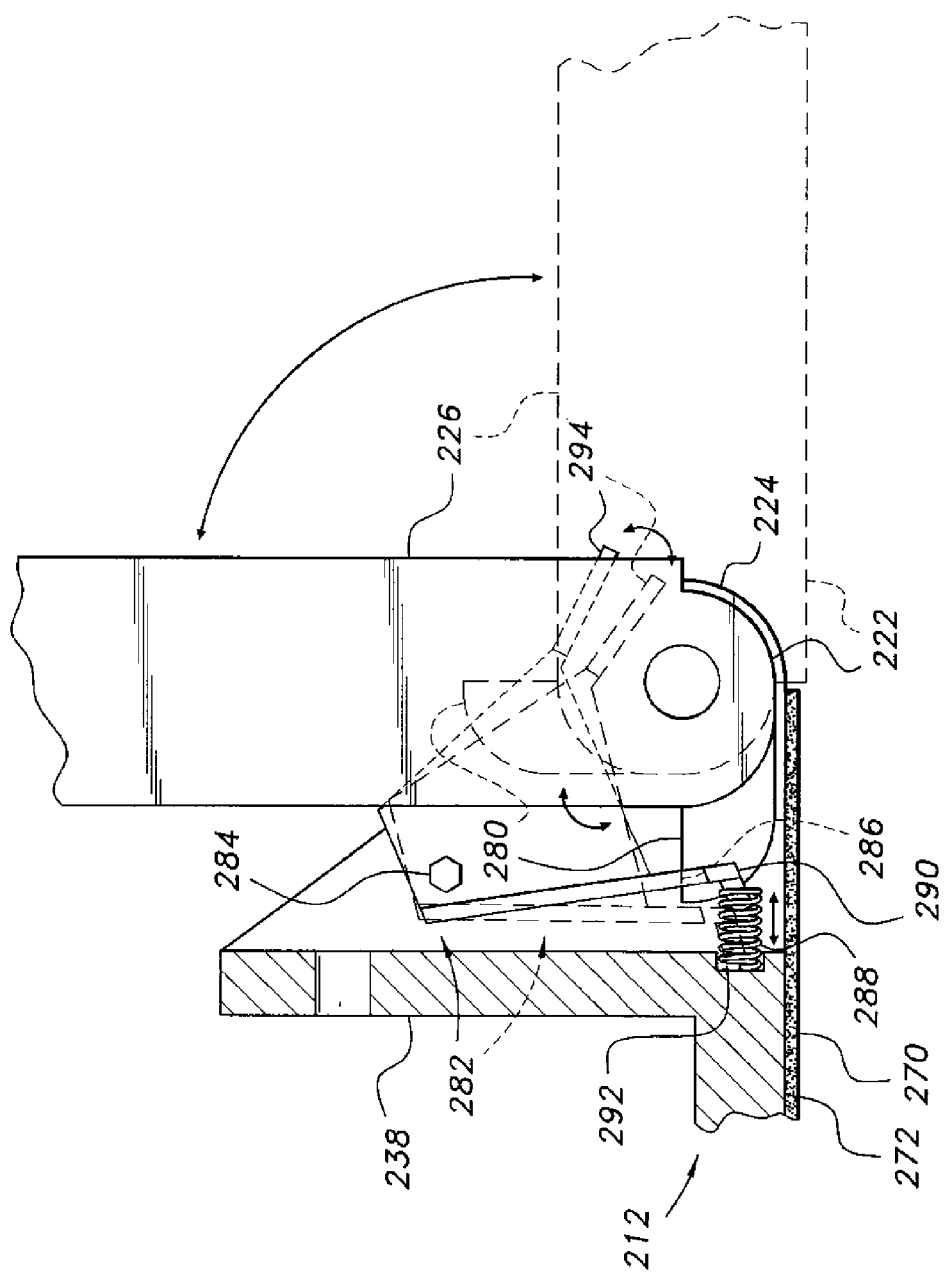
FIG. 9 is a right side elevation view in section through the base plate of the backrest of FIGS. 5 through 8, showing operation of the seatback support strut latch mechanism.

A thumb or finger actuation tab 294 extends forwardly from the latch plate 282, for releasing the latch assembly to allow the seatback support strut to fold forwardly as shown in broken lines in FIG. 9. A user of the device may press downwardly and rearwardly on the actuation tab 294 to push the lower edge 286 of the latch plate 282 rearwardly against the pressure of the spring 288, thereby allowing the lower edge 286 to clear the catch or tab 280 of the seatback support strut to allow the strut to fold forwardly. The rounded lower and rearward edge of the catch or tab 280 automatically pushes the latch plate 282 rearwardly when the seatback support strut is raised, with the latch plate 282 springing forward to capture the catch or tab 280 of the seatback support strut when the strut is raised completely.

Figure 7:
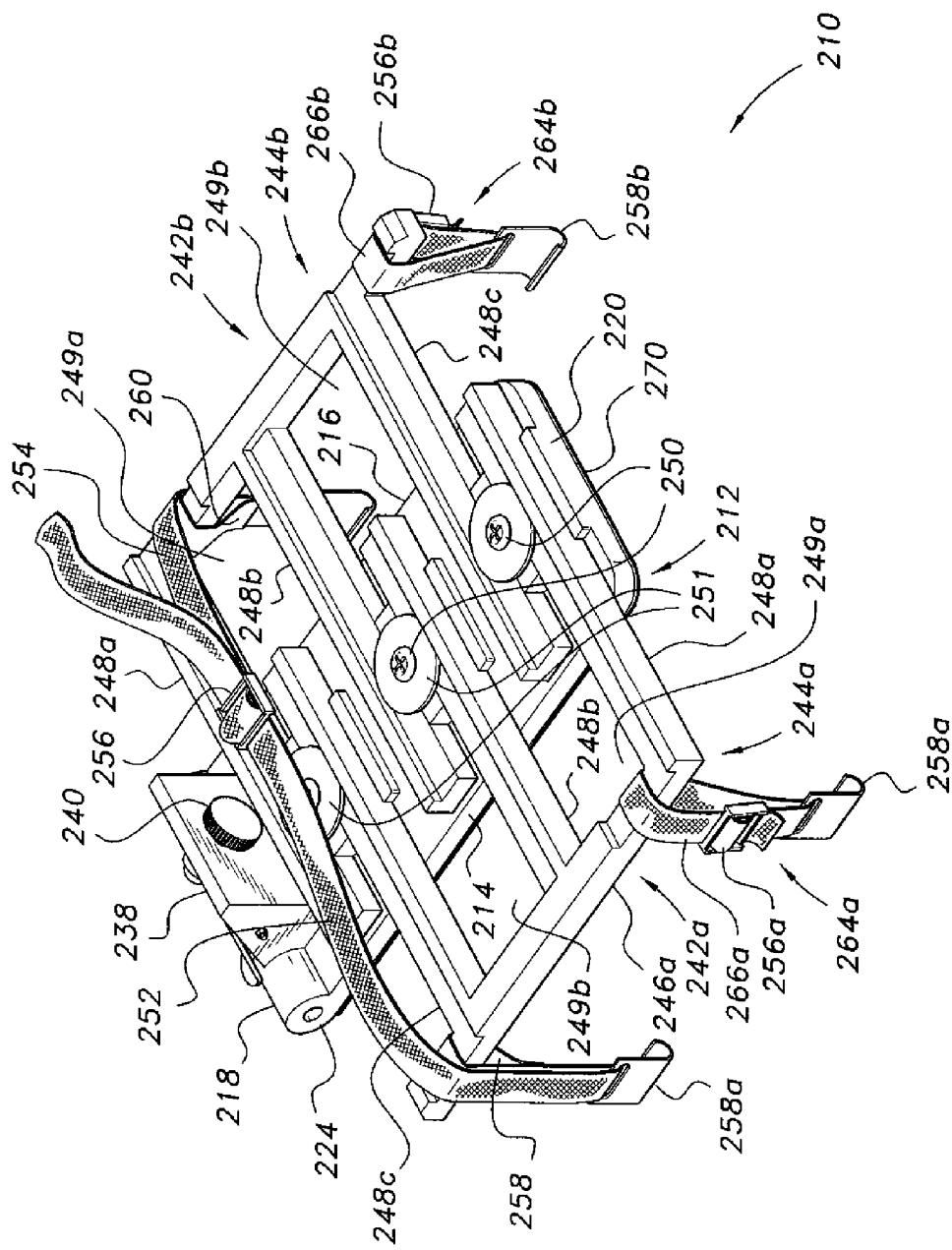
FIG. 7 is a rear perspective view of the backrest of FIGS. 5 and 6, illustrating two alternative attachment strap configurations.
Figure 8:
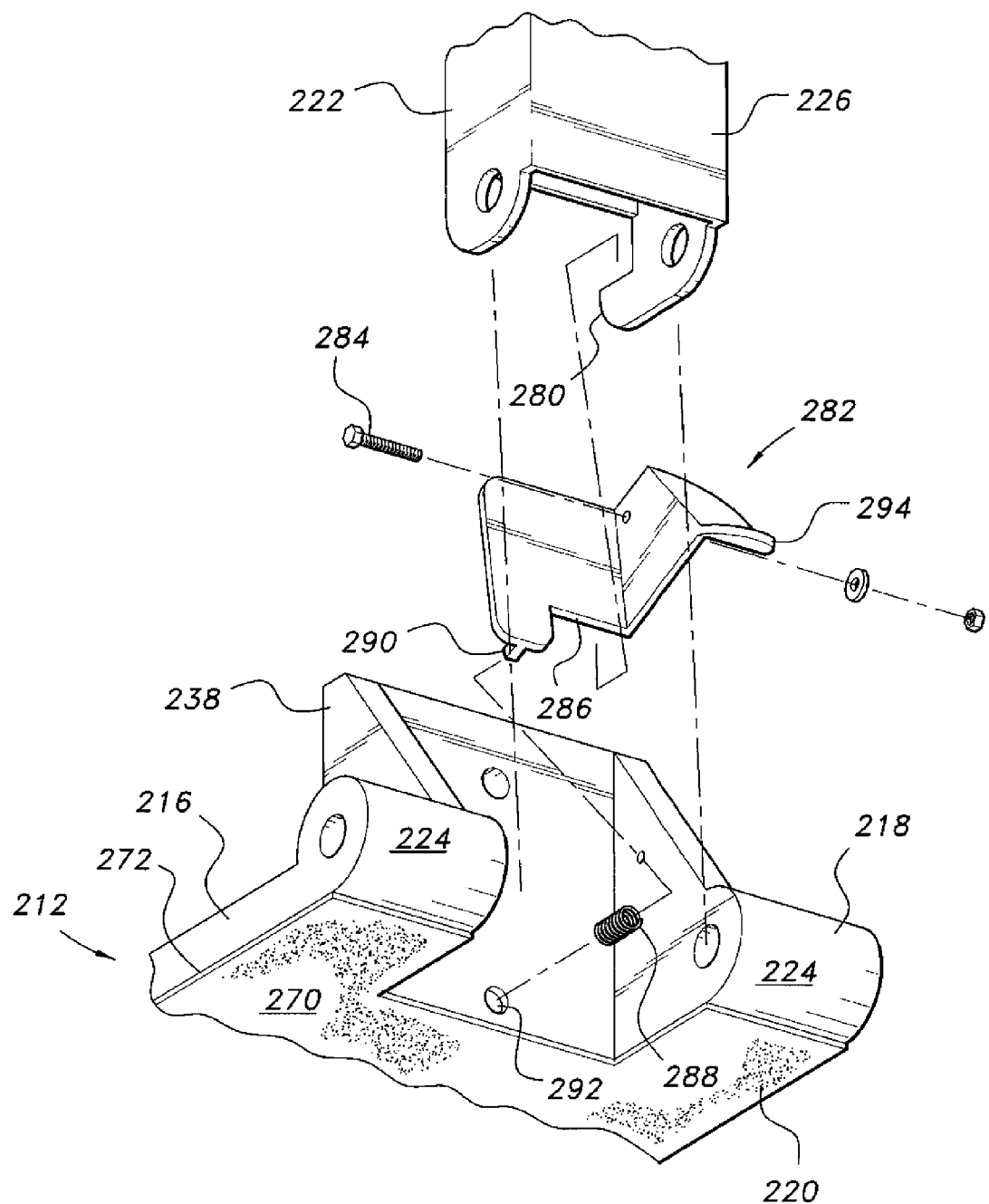
FIG. 8 is an exploded partial perspective view of the backrest of FIG. 5, showing the lower end of the seatback support strut and the latch assembly therefor.

The removable backrest 210 attaches to the motorcycle seat by means of its first and second attachment strap assemblies 242a and 242b, respectively, with the complete assemblies (with straps) being shown in FIG. 7. These two attachment strap assemblies 242a, 242b are preferably identical to one another, but are reversed to extend to the left or right side of the seat.

Each of the identical first and second attachment strap assemblies 242a, 242b includes a strap bracket, respectively 244a and 244b. Each of the strap brackets 244a, 244b comprises a strap support member, respectively 246a and 246b, having a series of laterally extending (relative to the orientation of the base plate 212) bracket attachment arms, respectively 246a, 246b, and 246c for each bracket. The three attachment arms 246a through 246c of each bracket define two elongate slots, respectively 249a and 249b for each bracket, therebetween.

A plurality of raised guides may be provided on the top surface of the base plate 212, with the bracket attachment arms 246a through 246c of each bracket 244a, 244b fitting between corresponding guides to secure the brackets longitudinally with respect to the base plate. A series of threaded members, e.g., bolts 250, threaded studs, etc., are installed in corresponding threaded passages in certain of the guides, to extend upwardly from the base plate 212. As the guides are located between the bracket arms 246a through 246c, it will be seen that the bolts or fasteners 250 pass between the arms and through the corresponding slots 249a, 249b defined by the arms. Large washers 251 or the like are captured by the bolts or fasteners 250, and extend over the arms 246a through 246c to secure the arms, and thus the strap brackets 244a and 244b, immovably to the base plate 212 as desired. The motorcyclist need only loosen the fasteners 250 to loosen the grip of the washers 251 on the arms 246a through 246c, thereby allowing the strap brackets 244a and 244b to be repositioned laterally (as shown by the broken line positions in FIG. 6) to adjust for the width of the motorcycle seat to which the device is installed.

Various attachment strap configurations may be provided, as noted further above. FIG. 7 illustrates two such strap configurations, with it being understood that these two configurations are exemplary to show two alternative arrangements. Both would not likely be installed on the same attachment strap assemblies as illustrated, although such a strap arrangement is feasible and may be selected by the user of the mechanism if so desired.

The strap assembly shown attached to the forward portions of the two attachment strap assemblies 242a, 242b in FIG. 7 comprises a first strap and a second strap, respectively 252 and 254, joined at an adjustment buckle 256. The first strap 252 has a first end permanently attached to an adjustment buckle 256, and an opposite second end 258. The strap 252 extends from the buckle 256, across and downwardly over the outer side member of the first strap bracket 244a and through a slot in the first or left side seat base hook 258a. The second end 258 of the first strap 252 terminates in a loop secured about the forward end of the side member of the first strap bracket 244a.

The second strap 254 is connected to the first strap 252 through the buckle 256, with the two straps 252, 254 extending laterally across the two strap brackets 244a and 244b. The second strap 254 extends downwardly over the outer member of the second strap bracket 244b and through the slot in the second or right side seat base hook 258b, and back up to terminate in a second end portion 260 comprising a loop secured about the forward end of the side member of the second strap bracket 244b. The two hooks 258a, 258b are preferably coated with a relatively soft and/or resilient material to avoid marring the underlying seat support structure of the motorcycle.

FIG. 7 also illustrates another alternative strap embodiment comprising separate straps 264a and 264b, respectively. Each strap 264a and 264b has a first end 266a and 266b having a buckle 256a and 256b permanently attached thereto. The two buckles 256a, 256b are substantially identical to the single buckle 256 of the embodiment of the two straps 252 and 254 shown attached to the forward portions of the two attachment strap assemblies 242a and 242b. Each of the straps 264a, 264b extends from its buckle to pass over the outer member of its respective strap bracket 244a, 244b, thence downward to pass through the slot or eye of its respective seat base hook 258a or 258b, and back through the respective buckle 256a or 256b. In this configuration, the separate and independent straps with their respective buckles allow each side to be adjusted independently of the other.

The backrest for motorcyclists 210 is used in much the same manner as the backrest 10 and 110 of FIGS. 1 through 4, discussed further above. The backrest 210 is initially placed atop the seat of the motorcycle and positioned as desired, e.g., as shown in FIG. 1 of the drawings. The forward and rearward pairs of strap bracket members 246a and 246b are adjusted to the desired width in accordance with the width of the motorcycle seat S by loosening the threaded fasteners or members 250 passing through the slots 249a and 249b between the arms 248a through 248c of the two bracket members 246a, 246b, and sliding the two members inwardly or outwardly relative to one another until the desired span is achieved. The fasteners 250 are then tightened to lock this span adjustment.

The straps 252 and 254 and/or straps 264a and 264b (shown in FIG. 7) may then be adjusted as desired. The straps are cinched up to some degree in order to remove excessive slack, and the seat base hooks 258a, 258b are hooked under the edges of the seat support pan or structure. The straps 252, 254 or 264a and 264b are then tightened and secured as explained further above to complete the installation of the backrest 210 atop the motorcycle seat. Additional security for the backrest 210 may be provided by applying a coating 270 having a high coefficient of friction, e.g., Neoprene® or other suitable material, to the underlying seat contact surface 272 of the base plate 212, as shown particularly in FIGS. 8 and 9. At this point, the height and angle of the seatback 230 may be adjusted as desired, and the backrest is ready for use.

The adjustable strut is folded forwardly to place the seatback 230 against the forward portion of the motorcycle seat to facilitate mounting the motorcycle, and then extended back to its operational position to allow the motorcyclist to place his or her back against the seatback 230 for support while riding. The latch mechanism illustrated in FIGS. 8 and 9 secures the strut and its seatback 230 in an upright orientation, once the strut and seatback have been raised. The relatively wide and rigid structure of the assembled strap brackets 244a, 244b enable the device to be used as a luggage carrier, as well. Removal of the device is accomplished essentially by reversing the steps described above. The motorcycle remains unmodified and undamaged throughout the installation, use, and removal of the backrest 210.

It is to be understood that the present invention is not limited to the embodiments described above, but encompasses any and all embodiments within the scope of the following claims.

I claim:
1. A backrest for a motorcyclist, comprising:
a base plate having a forward edge;
first and second strap assemblies attached to the base plate, each of the strap assemblies having a pair of hooks adapted for hooking onto a bottom edge of a motorcycle seat and a strap slidably disposed through the hooks, the straps being tightened to retain the base plate on the motorcycle seat;

a seatback support strut extending from the forward edge of the base plate, the seatback support strut having an attachment end and a distal end opposite the attachment end; and a seatback attached to the distal end of the seatback support strut.

2. The backrest for a motorcyclist according to claim 1 further including a seatback support strut hinge pintle laterally disposed across the forward edge of the base plate, the attachment end of the seatback support strut being pivotally attached to the hinge pintle.

3. The backrest for a motorcyclist according to claim 1, wherein the seatback support strut comprises a base plate attachment portion and a seatback attachment portion telescopically extending from the base plate attachment portion.

4. The backrest for a motorcyclist according to claim 1, wherein the seatback is pivotally attached to the distal end of the seatback support strut.

5. The backrest for a motorcyclist according to claim 1, wherein each of the attachment strap assemblies has at least one strap support member slidably engaged with the base plate, the strap support members having at least one elongate slot therein, the backrest member further comprising a plurality of threaded members extending upwardly from the base plate, the threaded members passing through the slots in the strap support members to selectively clamp the strap assemblies against the base plate.

6. The backrest for a motorcyclist according to claim 1, wherein the base plate has a seat contact surface having a high friction coefficient coating disposed thereon.

7. The backrest for a motorcyclist according to claim 1, further including a latch mechanism selectively holding the seatback support strut in an upright position.

8. A backrest for a motorcyclist, comprising:
a base plate having a forward edge;
a plurality of attachment strap assemblies attached to the base plate, the strap assemblies being adapted for releasably attaching the base plate to a motorcycle seat;
a seatback support strut hinge pintle laterally disposed across the forward edge of the base plate;
a seatback support strut pivotally extending from the seatback support strut hinge pintle, the seatback support strut having a pintle attachment end and a distal end opposite the pintle attachment end; and
a seatback attached to the distal end of the seatback support strut.

9. The backrest for a motorcyclist according to claim 8 wherein each of the attachment strap assemblies has a pair of hooks adapted for hooking onto a bottom edge of a motorcycle seat and a strap slidably disposed through the hooks, the straps being tightened to retain the base plate on the motorcycle seat.

10. The backrest for a motorcyclist according to claim 8, wherein, each of the attachment strap assemblies has at least one strap support member slidably engaged with the base plate, each of the strap support members having at least one elongate slot therein, the backrest further comprising a plurality of threaded members extending upwardly from the base plate, the threaded members passing through the slots in the strap support members to selectively clamp the strap assemblies against the base plate.

11. The backrest for a motorcyclist according to claim 8, wherein the seatback support strut comprises a base plate attachment portion and a seatback attachment portion telescopically extending from the base plate attachment portion.

12. The backrest for a motorcyclist according to claim 8, wherein the seatback is pivotally attached to the distal end of the seatback support strut.

13. The backrest for a motorcyclist according to claim 8, wherein the base plate has a seat contact surface having a high friction coefficient coating disposed thereon.

14. The backrest for a motorcyclist according to claim 8, further including a latch mechanism selectively holding the seatback support strut in an upright position.

15. A backrest for a motorcyclist, comprising:
a base plate having a forward edge;
a plurality of attachment strap assemblies extending laterally from the base plate, the strap assemblies being adapted for releasably attaching the base plate to a motorcycle seat;
a seatback support strut extending from the forward edge of the base plate, the seatback support strut having a base plate portion attached to the base plate and a seatback portion telescopically extending from the base plate portion; and
a seatback attached to the seatback portion of the seatback support strut.

16. The backrest for a motorcyclist according to claim 15, wherein each of the attachment strap assemblies has a pair of hooks adapted for hooking onto a bottom edge of a motorcycle seat and a strap slidably disposed through the hooks, the straps being tightened to retain the base plate on the motorcycle seat.

17. The backrest for a motorcyclist according to claim 15, wherein each of the attachment strap assemblies has at least one strap support member slidably engaged with the base plate, each of the strap support members having at least one elongate slot therein, the backrest further comprising a plurality of threaded members extending upwardly from the base plate, the threaded members passing through the slots in the strap support members to selectively clamp the strap assemblies against the base plate.

18. The backrest for a motorcyclist according to claim 15, further comprising a seatback support strut hinge pintle laterally disposed across the forward edge of the base plate, the seatback support strut having a pintle attachment end and a distal end opposite the pintle attachment end, the seatback being attached to the distal end of the seatback support strut.

19. The backrest for a motorcyclist according to claim 18, wherein the seatback is pivotally attached to the distal end of the seatback support strut.

20. The backrest for a motorcyclist according to claim 15, wherein the base plate has a seat contact surface having a high friction coefficient coating disposed thereon.

* * * * *